United States Patent
Walker et al.

(10) Patent No.: US 9,889,892 B2
(45) Date of Patent: Feb. 13, 2018

(54) ATTACHMENT BULKHEAD FOR BODY STRUCTURES

(71) Applicant: GM GLOBAL TECHNOLOGY OPERATIONS LLC, Detroit, MI (US)

(72) Inventors: Travis W. Walker, Royal Oak, MI (US); Darek G. Villeneuve, Clarkston, MI (US); Terry A. Swartzell, Ann Arbor, MI (US); Daniel C. Dokter, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/212,903

(22) Filed: Jul. 18, 2016

(65) Prior Publication Data
US 2018/0015961 A1  Jan. 18, 2018

(51) Int. Cl.
*B62D 27/06* (2006.01)
(52) U.S. Cl.
CPC .................. *B62D 27/065* (2013.01)
(58) Field of Classification Search
CPC .................................... B62D 27/065
USPC ............................................. 296/29
See application file for complete search history.

(56) References Cited

U.S. PATENT DOCUMENTS

| 6,769,733 B2 * | 8/2004 | Seksaria | B60K 5/12 296/192 |
| 8,794,696 B2 * | 8/2014 | Iseki | B62D 21/11 296/203.02 |

* cited by examiner

*Primary Examiner* — Joseph D. Pape
*Assistant Examiner* — Dana Ivey
(74) *Attorney, Agent, or Firm* — Quinn IP Law

(57) ABSTRACT

An attachment for connecting a chassis structure to a hollow beam of a body structure includes a tube nut, a bulkhead, and a bolt. The bulkhead has a cavity surface configured to conform to a cylindrical outer surface of the tube nut. The bulkhead is disposed within the hollow beam and is attached to at least two walls of the hollow beam and to the tube nut. A first portion of the cylindrical outer surface of the tube nut is disposed in close proximity to the cavity surface of the bulkhead. A bottom surface of the tube nut contacts an inner surface of a bottom wall of the hollow beam. The bolt extends from the chassis structure, through a hole formed in the bottom wall of the hollow beam, and into the tube nut to connect the chassis structure to the body structure. The attachment may include a second bulkhead.

18 Claims, 4 Drawing Sheets

ATTACHMENT BULKHEAD FOR BODY STRUCTURES

TECHNICAL FIELD

This disclosure relates to an attachment bulkhead for body structures.

BACKGROUND

A vehicle may include a body structure and a chassis structure. The chassis structure may be connected to the body structure at an attachment.

SUMMARY

An attachment and a vehicle are disclosed herein. The attachment is configured to connect a chassis structure to a hollow beam of a body structure having a bottom wall, a top wall, a first side wall, and a second side wall. The bottom wall includes an inner surface and forms a hole. The attachment includes a tube nut, a first bulkhead, and a bolt. The tube nut has an internal thread, a cylindrical outer surface including a first portion and a second portion, and a bottom portion having a bottom surface. The first bulkhead has a cavity surface configured to conform to the first portion of the cylindrical outer surface of the tube nut. The first bulkhead is disposed within the hollow beam and is attached to at least two of the walls of the hollow beam and to the tube nut. The bolt has an external thread configured to engage the internal thread of the tube nut. The first portion of the cylindrical outer surface of the tube nut is disposed in close proximity to the cavity surface of the first bulkhead. The bottom surface of the tube nut contacts the inner surface of the bottom wall of the hollow beam. The bolt extends from the chassis structure, through the hole formed in the bottom wall of the hollow beam, and into the tube nut, engaging the internal thread of the tube nut with the external thread of the bolt to connect the chassis structure to the body structure.

The attachment may also include a second bulkhead. The second bulkhead may have a cavity surface configured to conform to the second portion of the cylindrical outer surface of the tube nut. The second bulkhead may be disposed within the hollow beam and attached to at least two of the walls of the hollow beam and to the tube nut. The second portion of the cylindrical outer surface of the tube nut may be disposed in close proximity to the cavity surface of the second bulkhead.

The vehicle has a body structure, a chassis structure and an attachment. The body structure includes a hollow beam having a bottom wall, a top wall, a first side wall, and a second side wall. The bottom wall includes an inner surface and forms a hole. The chassis structure includes a chassis mount. The attachment is configured to connect the chassis structure to the hollow beam of the body structure. The attachment includes a tube nut, a first bulkhead, and a bolt. The tube nut has an internal thread, a cylindrical outer surface including a first portion and a second portion, and a bottom portion including a flange and a bottom surface. The first bulkhead has a cavity surface configured to conform to the first portion of the cylindrical outer surface of the tube nut. The first bulkhead is disposed within the hollow beam and is attached to at least two of the walls of the hollow beam. The first bulkhead is attached to the tube nut via a first arc weld. A groove is formed between the first bulkhead and the tube nut. The first arc weld is located in the groove formed between the first bulkhead and the tube nut. The bolt has an external thread configured to engage the internal thread of the tube nut. The first portion of the cylindrical outer surface of the tube nut is disposed in close proximity to the cavity surface of the first bulkhead. The bottom surface of the tube nut contacts the inner surface of the bottom wall of the hollow beam. The bolt extends from the chassis mount of the chassis structure, through the hole in the bottom wall of the hollow beam, and into the tube nut, engaging the internal thread of the tube nut with the external thread of the bolt to connect the chassis structure to the body structure.

The vehicle may include a second bulkhead. The second bulkhead may have a cavity surface configured to conform to the second portion of the cylindrical outer surface of the tube nut and may be configured to form a slot. The second bulkhead may be disposed within the hollow beam and attached to at least two of the walls of the hollow beam. The second bulkhead may be attached to the first bulkhead. The second bulkhead may be attached to the tube nut via a second arc weld located in the slot. The second portion of the cylindrical outer surface of the tube nut is disposed in close proximity to the cavity surface of the second bulkhead.

The attachment and the vehicle disclosed herein provide a lightweight and durable connection between a chassis structure and a hollow beam of a body structure. This disclosure applies to any machine or manufacture requiring a lightweight and durable attachment of a first part or structure to a hollow beam of a second structure. This disclosure applies to any vehicle, including but not limited to cars, trucks, vans, all-terrain vehicles, busses, boats, trains, airplanes, manufacturing vehicles and equipment, construction vehicles and equipment, maintenance vehicles and equipment, etc.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward,"

"top," "bottom," etc., are used descriptively for the figures, and do not represent limitations on the scope of the disclosure, as defined by the appended claims.

Figure 1:
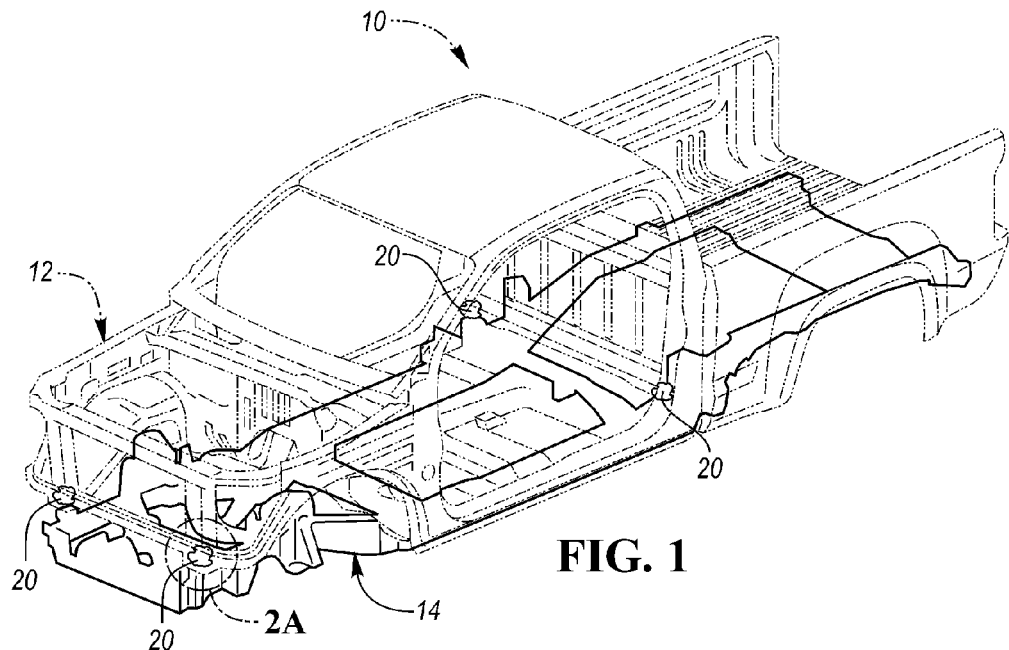
FIG. 1 is a fragmentary, schematic, perspective illustration of a vehicle having a chassis structure connected to a body structure via an attachment of the type disclosed herein.
Figure 2A:
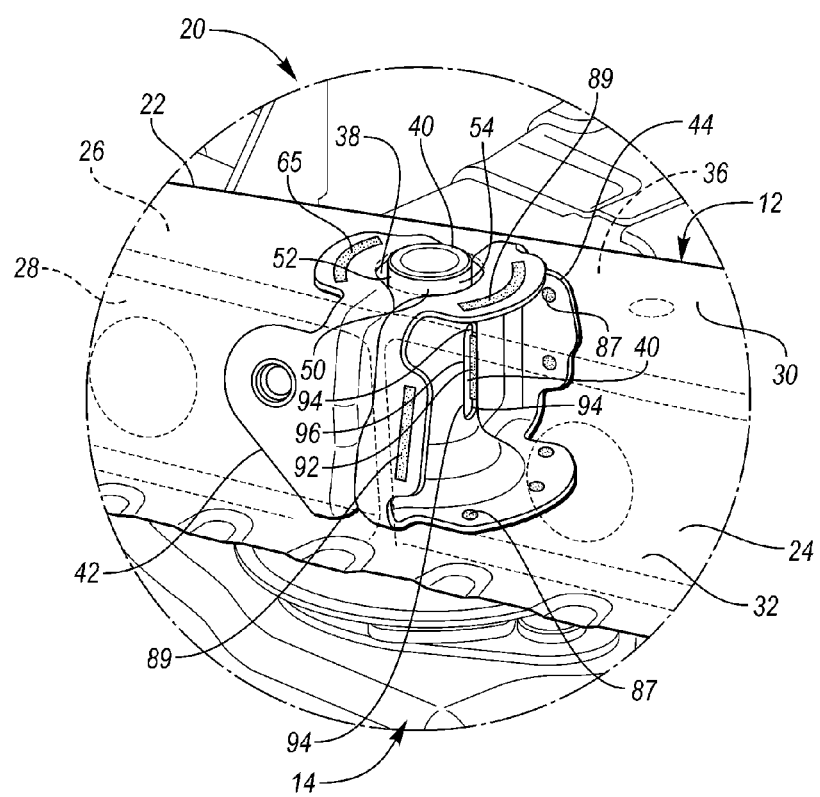
FIG. 2A is a schematic, perspective illustration of the attachment of FIG. 1 that includes two bulkheads.
Figure 2B:
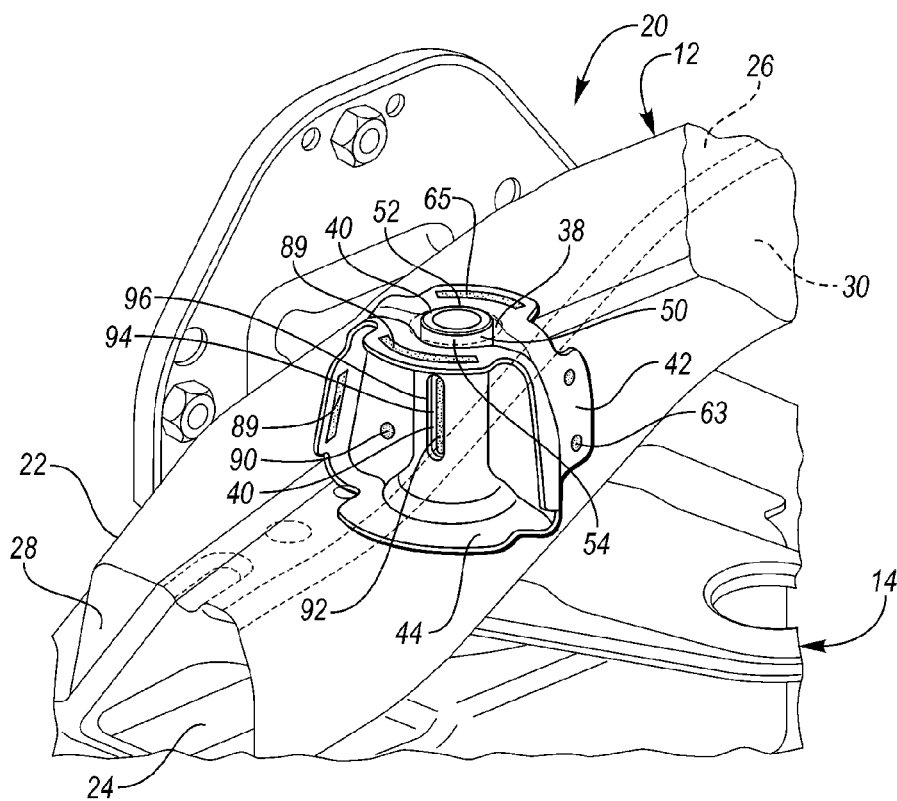
FIG. 2B is a schematic, perspective illustration of the attachment of FIG. 1 that includes two bulkheads, viewed from another angle.

Referring to the drawings, wherein like reference numbers refer to like components throughout the views, FIG. 1 shows an example vehicle 10. The vehicle 10 includes an attachment 20 of the type disclosed herein. While the vehicle 10 of FIG. 1 is a typical example application suitable for the attachment 20 disclosed herein, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the attachment 20 to such an embodiment.

Referring now to FIG. 1, the vehicle 10 includes a body structure 12 and a chassis structure 14. The body structure 12 and the chassis structure 14 may be made of a metal material, such as a steel or an aluminum alloy, or of a non-metal material, such as a reinforced plastic or composite material, or of any other suitable structural material. The vehicle 10 includes the attachment 20 configured to connect the chassis structure 14 to the body structure 12. Example locations of the attachment 20 are shown in FIG. 1. However, the attachment 20 may be located anywhere in the vehicle 10 where the chassis structure 14 may be connected to the body structure 12. There may be a plurality of attachments 20, as shown.

Referring now to FIGS. 2A-5, the body structure 12 includes a hollow beam 22. The hollow beam 22 has a bottom wall 24, a top wall 26, a first side wall 28, and a second side wall 30. The hollow beam 22 may include additional walls. The bottom wall 24 includes an inner surface 32 and forms an opening or hole 34. The hole 34 may be round, as shown. The top wall 24 includes an outer surface 36 and may form an opening or hole 38. The hole 38 may be round, as shown.

Figure 3:
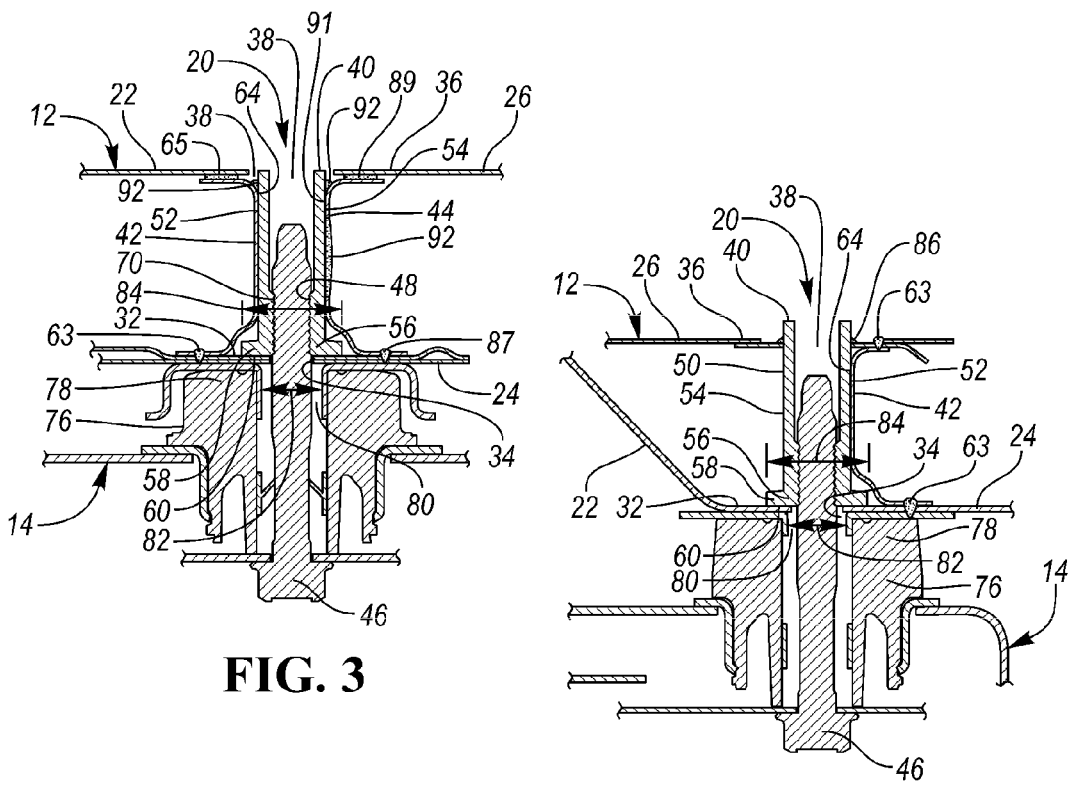
FIG. 3 is a schematic, cross-sectional illustration of the attachment of FIG. 1 that includes two bulkheads.
Figure 5:
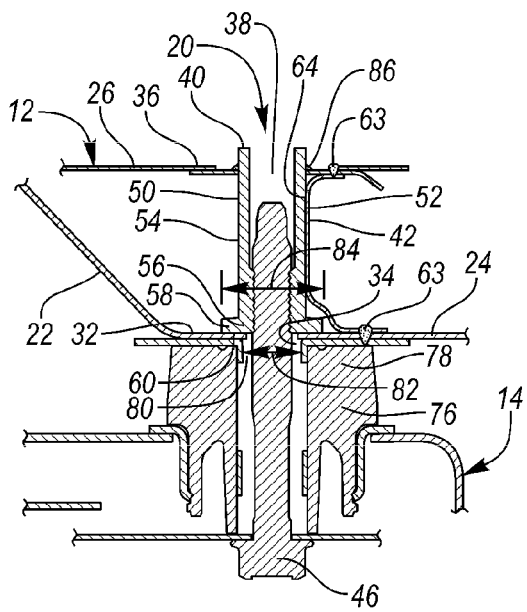
FIG. 5 is a schematic, cross-sectional illustration of the attachment of FIG. 1 that includes one bulkhead.
Figure 4A:
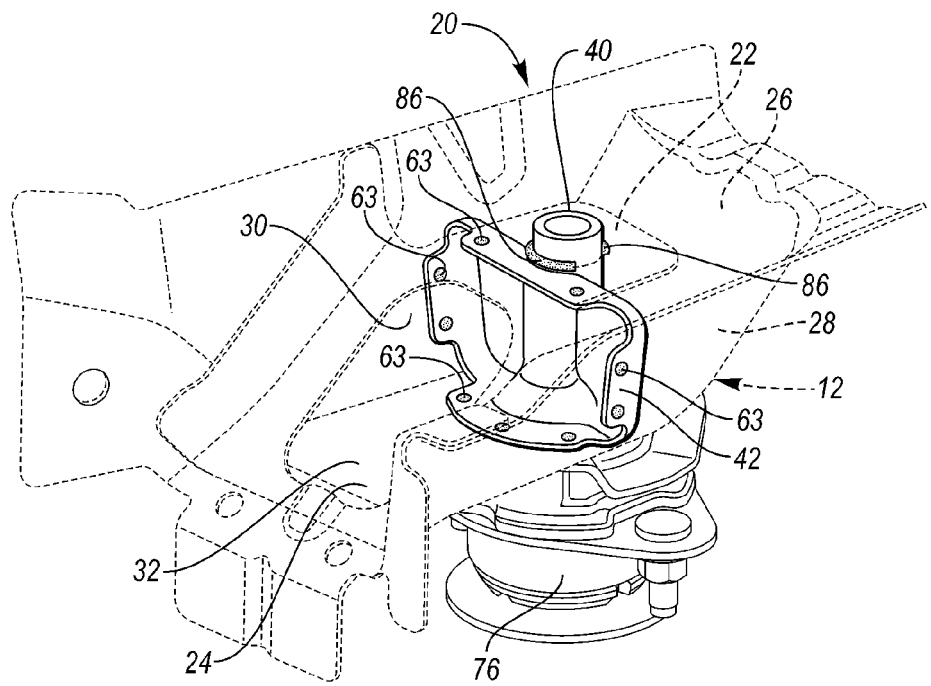
FIG. 4A is a schematic, perspective illustration of the attachment of FIG. 1 that includes one bulkhead.
Figure 4B:
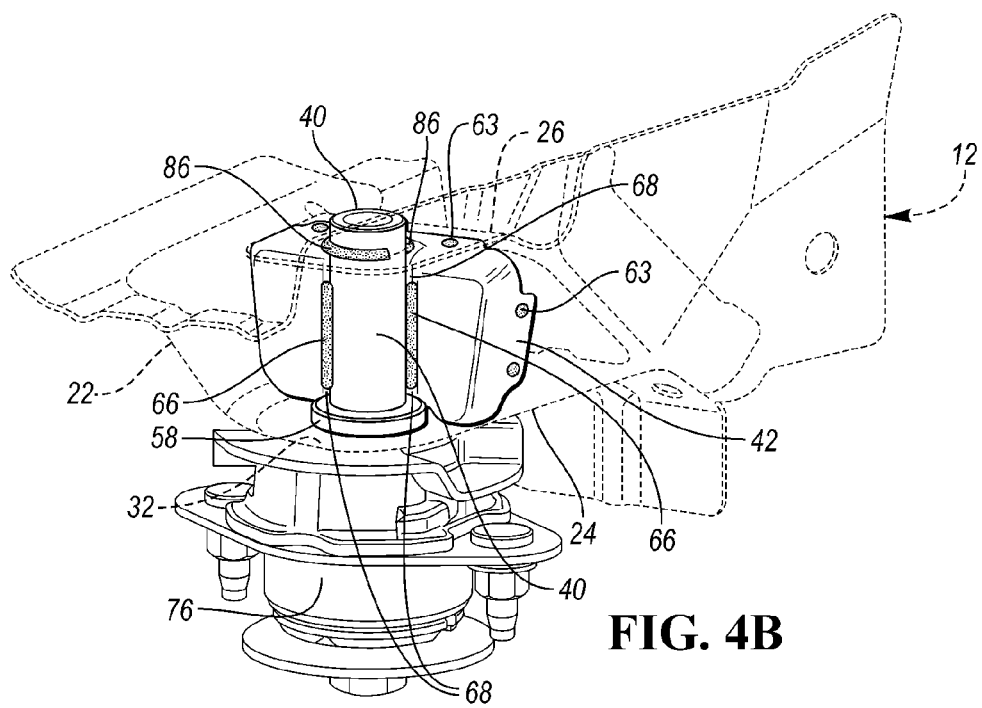
FIG. 4B is a schematic, perspective illustration of the attachment of FIG. 1 that includes one bulkhead, viewed from another angle.

The attachment 20 includes a tube nut 40, a first bulkhead 42, and a fastener or bolt 46. The attachment 20 may include a second bulkhead 44. The tube nut 40 has an internal thread 48. The internal thread 48 may extend over the entire length of the tube nut 40, or alternatively, over a portion of the length of the tube nut 40, as shown in FIGS. 3 and 5.

Referring now to FIGS. 2A-6, the tube nut 40 has a cylindrical outer surface 50 including a first portion 52 and a second portion 54, and a bottom portion 56 including a bottom surface 60. The first portion 52 of the cylindrical outer surface 50 of the tube nut 40 may be a first half of the cylindrical outer surface 50 of the tube nut 40, as shown. Alternatively, the first portion 52 of the cylindrical outer surface 50 of the tube nut 40 may be less than the first half of the cylindrical outer surface 50 of the tube nut 40. The second portion 54 of the cylindrical outer surface 50 of the tube nut 40 may be a second half of the cylindrical outer surface 50 of the tube nut 40, as shown. Alternatively, the second portion 54 of the cylindrical outer surface 50 of the tube nut 40 may be less than the second half of the cylindrical outer surface 50 of the tube nut 40. The bottom portion 56 of the tube nut 40 may include a flange 58.

The first bulkhead 42 forms a cylindrical cavity 62 and has a cavity surface 64 adjacent to the cylindrical cavity 62 and configured to conform to the first portion 52 of the cylindrical outer surface 50 of the tube nut 40. The cavity surface 64 may be configured to conform to substantially the first half of the cylindrical surface 50 of the tube nut 40, as shown. The first bulkhead 42 is disposed within the hollow beam 22 and is attached to at least two of the walls 24, 26, 28, 30 of the hollow beam 22 and to the tube nut 40.

The first bulkhead 42 may be attached to at least three of the walls 24, 26, 28, 30 of the hollow beam 22. The first bulkhead 42 may be attached to all of the walls 24, 26, 28, 30 of the hollow beam 22. The first bulkhead 42 may be attached to the at least two of the walls 24, 26, 28, 30 of the hollow beam 22 via a spot weld 63, an adhesive 65, a mechanical fastener (not shown), an arc weld (not shown), or any other suitable type of attachment. An arc weld is defined herein as a Metal Inert Gas (MIG) weld, an arc braze weld, or any other suitable type of arc weld, as understood by those skilled in the art. The first bulkhead 42 may be attached to the at least two of the walls 24, 26, 28, 30 of the hollow beam 22 via a combination of two or more types of attachments, as appropriate.

The first bulkhead 42 may be attached to the first portion 52 of the cylindrical outer surface 50 of the tube nut 40 via a first arc weld 66 or via any other suitable attachment. The first arc weld 66 may be located in a groove 68 formed between the first bulkhead 68 and the tube nut 40. The groove 68 may be parallel to the axis of symmetry of the tube nut 40 and the bolt 46. The first bulkhead 42 may be attached to the tube nut 40 via a plurality of first arc welds 66. The plurality of first arc welds 66 may be located in a plurality of grooves 68 formed between the first bulkhead 42 and the tube nut 40.

Figure 6:
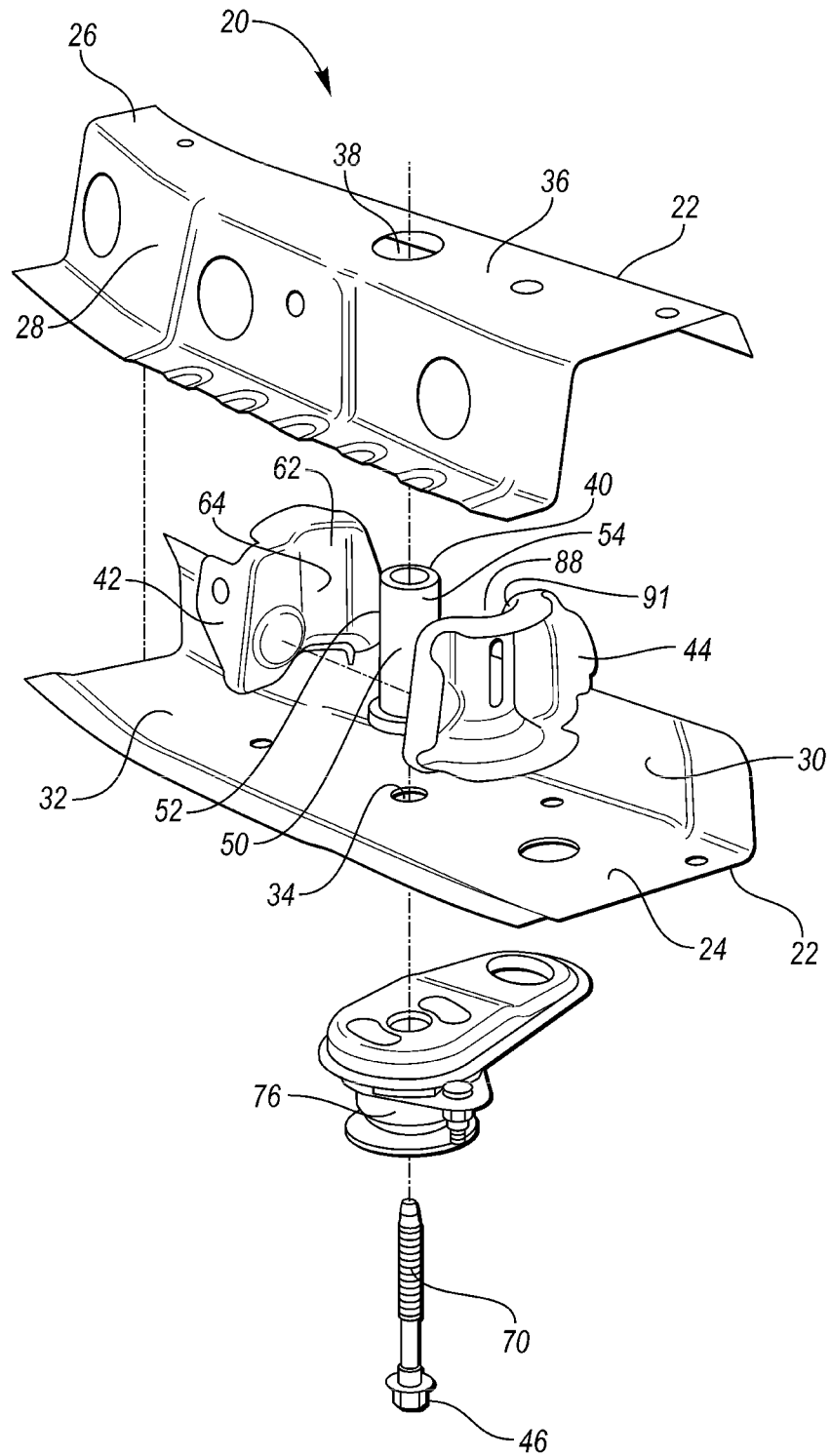
FIG. 6 is a schematic, perspective, exploded view illustration of the attachment of FIG. 1 that includes two bulkheads.

The fastener or bolt 46 has an external thread 70 configured to engage the internal thread 48 of the tube nut 40. The fastener or bolt 46 may be a chassis mount bolt, as understood by those skilled in the art, or any other suitable type of bolt or mechanical fastener. The external thread 70 may extend over the entire length of the bolt 46, or alternatively, over a portion of the length of the bolt 46, as best seen in FIG. 6.

Continuing to refer to FIGS. 2A-6, the first portion 52 of the cylindrical outer surface 50 of the tube nut 40 is disposed in the cylindrical cavity 62 in close proximity to the cavity surface 64 of the first bulkhead 42. The bottom surface 60 of the tube nut 40 contacts the inner surface 32 of the bottom wall 24 of the hollow beam 22. The bolt 46 extends from the chassis structure 14, through the hole 34 formed in the bottom wall 24 of the hollow beam 20, and into the tube nut 40, engaging the internal thread 48 of the tube nut 40 with the external thread 70 of the bolt 46 to connect the chassis structure 14 to the body structure 12.

The chassis structure 14 may include a chassis mount 76, as understood by those skilled in the art. The chassis mount 76 may be configured to isolate the body structure 12 from vibrations in the chassis structure 14. The bolt 46 may extend from the chassis mount 76 of the chassis structure 14, through the hole 34 in the bottom wall 24 of the hollow beam 22, and into the tube nut 40, engaging the internal thread 48 of the tube nut 40 with the external thread 70 of the bolt 46 to connect the chassis structure 14 to the body structure 12. The bottom wall 24 of the hollow beam 22 may be clamped between the tube nut 40 and the chassis mount 76 when the internal thread 48 of the tube nut 40 is engaged with the external thread 70 of the bolt 46 to connect the chassis structure 14 to the body structure 12.

Referring now specifically to FIGS. 3 and 5, the chassis mount 76 may include a top portion 78 that forms a cylindrical passage 80 having an inner diameter 82. The flange 58 of the bottom portion 56 of the tube nut 40 has an outer diameter 84. The outer diameter 84 of the flange 58 may be at least 6 mm greater than the inner diameter 82 of the cylindrical passage 80 of the chassis mount 76.

The tube nut 40 may extend from the inner surface 32 of the bottom wall 24 of the hollow beam 22 to at least the outer surface 36 of the top wall 26 of the hollow beam 22, as best seen in FIGS. 3 and 5. The tube nut 40 may be attached to the top wall 26 of the hollow beam 22 via an arc weld 86, as shown in FIG. 5, or via any other suitable attachment.

Referring now specifically to FIGS. 2A-3 and 6, the second bulkhead 44 may form a cylindrical cavity 88 having a cavity surface 91 adjacent to the cylindrical cavity 88 and configured to conform to the second portion 54 of the cylindrical surface 50 of the tube nut 40. The cavity surface 91 may be configured to conform to substantially the second half of the cylindrical surface 50 of the tube nut 40, as shown. The second bulkhead 44 may be disposed within the hollow beam 22, may be attached to at least two of the walls 24, 26, 28, 30 of the hollow beam 22, and may be attached to the to the tube nut 40. The second portion 54 of the cylindrical outer surface 50 of the tube nut 40 may be disposed in the cylindrical cavity 88 in close proximity to the cavity surface 91 of the second bulkhead 44.

The second bulkhead 44 may be attached to at least three of the walls 24, 26, 28, 30 of the hollow beam 22. The second bulkhead 44 may be attached to all of the walls 24, 26, 28, 30 of the hollow beam 22. The second bulkhead 44 may be attached to at least two of the walls 24, 26, 28, 30 of the hollow beam 22 via a spot weld 87, an adhesive 89, a mechanical fastener (not shown), an arc weld (not shown), or any other suitable type of attachment. The second bulkhead 44 may be attached to at least two of the walls 24, 26, 28, 30 of the hollow beam 22 via a combination of two or more types of attachments, as appropriate.

The first bulkhead 42 may be attached to the second bulkhead 44. The first bulkhead 42 may be attached to the second bulkhead 44 via a weld 90. The weld 90 may be a spot weld, an arc weld, or any other suitable type of weld. Alternatively, the first bulkhead 42 may be attached to the second bulkhead 44 via an adhesive (not shown), a mechanical fastener (not shown), or any other suitable attachment or combination of attachments.

The second bulkhead 44 may be attached to the second portion 54 of the cylindrical outer surface 50 of the tube nut 40 via a second arc weld 92 or via any other suitable attachment. The second arc weld 92 may be located in a groove 94 formed between the second bulkhead 44 and the tube nut 40. The groove 94 may be parallel to the axis of symmetry of the tube nut 40 and the bolt 46. The second bulkhead 44 may be attached to the tube nut 40 via a plurality of second arc welds 92. The plurality of second arc welds 92 may be located in a plurality of grooves 94 formed between the second bulkhead 44 and the tube nut 40. One of the first arc weld 66 and the second arc weld 94 may be located in a groove 68, 94 formed between the respective bulkhead 42, 44 and the tube nut 40.

One of the first bulkhead 42 and the second bulkhead 44 may be configured to form an elongated opening or slot 96. The long dimension of the slot 96 may be parallel to the axis of symmetry of the tube nut 40 and the bolt 46. One of the first arc weld 66 and the second arc weld 92 may be located in the groove 94 formed between the respective bulkhead 42, 44 and the tube nut 40 in the slot 96.

FIGS. 1-6 show the attachment 20 configured to connect the chassis 14 to the body 12 in a vertical orientation, i.e., the axis of symmetry of the tube nut 40 and the bolt 46 is normal to the ground plane. Ground plane is defined herein as the plane of the road or ground on which the vehicle 10 travels. However, it should be recognized that the attachment 20 may be configured to connect the chassis 14 to the body 12 in any other suitable orientation. For example, the attachment 20 may be configured to connect the chassis 14 to the body 12 in a horizontal orientation, i.e., the axis of symmetry of the tube nut 40 and the bolt 46 may be parallel to the ground plane.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An attachment configured to connect a chassis structure to a hollow beam of a body structure having a bottom wall including an inner surface and forming a hole, a top wall, a first side wall, and a second side wall, the attachment comprising:
   a tube nut, having:
      an internal thread;
      a cylindrical outer surface including a first portion and a second portion; and
      a bottom portion including a flange and a bottom surface;
   a first bulkhead having a cavity surface configured to conform to the first portion of the cylindrical surface of the tube nut, the first bulkhead disposed within the hollow beam and attached to at least two of the walls of the hollow beam and to the tube nut; and
   a bolt having an external thread configured to engage the internal thread of the tube nut;
   wherein the first portion of the cylindrical surface of the tube nut is disposed in close proximity to the cavity surface of the first bulkhead;
   wherein the bottom surface of the tube nut contacts the inner surface of the bottom wall of the hollow beam; and
   wherein the bolt extends from the chassis structure, through the hole formed in the bottom wall of the hollow beam, and into the tube nut, engaging the internal thread of the tube nut with the external thread of the bolt to connect the chassis structure to the body structure.

2. The attachment of claim 1, wherein the chassis structure includes a chassis mount; and
   wherein the bolt extends from the chassis mount of the chassis structure, through the hole in the bottom wall of the hollow beam, and into the tube nut, engaging the internal thread of the tube nut with the external thread of the bolt to connect the chassis structure to the body structure.

3. The attachment of claim 2, wherein the chassis mount includes a top portion that forms a cylindrical passage having an inner diameter;
   wherein the flange of the bottom portion of the tube nut has an outer diameter; and
   wherein the outer diameter of the flange is at least 6 mm greater than the inner diameter of the cylindrical passage.

4. The attachment of claim 1, wherein the first bulkhead is attached to the tube nut via an arc weld.

5. The attachment of claim 4, wherein the arc weld is located in a groove formed between the first bulkhead and the tube nut.

6. The attachment of claim 1, wherein the top wall of the hollow beam has an outer surface and is configured to form a hole; and wherein the tube nut extends from the inner surface of the bottom wall of the hollow beam to at least the outer surface of the top wall of the hollow beam.

7. The attachment of claim 6, wherein the tube nut is attached to the top wall of the hollow beam via an arc weld.

8. The attachment of claim 1, further comprising a second bulkhead having a cavity surface configured to conform to the second portion of the cylindrical surface of the tube nut, the second bulkhead disposed within the hollow beam and attached to at least two of the walls of the hollow beam and to the tube nut;
wherein the second portion of the cylindrical surface of the tube nut is disposed in close proximity to the cavity surface of the second bulkhead.

9. The attachment of claim 8, wherein the chassis structure includes a chassis mount; and
wherein the bolt extends from the chassis mount of the chassis structure, through the hole in the bottom wall of the hollow beam, and into the tube nut, engaging the internal thread of the tube nut with the external thread of the bolt to connect the chassis structure to the body structure.

10. The attachment of claim 9, wherein the chassis mount includes a top portion that forms a cylindrical passage having an inner diameter;
wherein the flange of the bottom portion of the tube nut has an outer diameter; and
wherein the outer diameter of the flange is at least 6 mm greater than the inner diameter of the cylindrical passage.

11. The attachment of claim 8, wherein the first bulkhead is attached to the tube nut via a first arc weld; and
wherein the second bulkhead is attached to the tube nut via a second arc weld.

12. The attachment of claim 11, wherein the first bulkhead is attached to the second bulkhead via a weld.

13. The attachment of claim 11, wherein one of the first and second arc welds is located in a groove formed between the respective bulkhead and the tube nut.

14. The attachment of claim 11, wherein one of the first and second bulkheads is configured to form a slot; and
wherein the respective arc weld is located in the slot.

15. The attachment of claim 8, wherein the top wall of the hollow beam has an outer surface and is configured to form a hole; and
wherein the tube nut extends from the inner surface of the bottom wall of the hollow beam to at least the outer surface of the top wall of the hollow beam.

16. The attachment of claim 15, wherein the tube nut is attached to the top wall of the hollow beam via an arc weld.

17. A vehicle, comprising:
a body structure including a hollow beam, the hollow beam having:
a bottom wall including an inner surface and forming a hole;
a top wall;
a first side wall; and
a second side wall;
a chassis structure including a chassis mount; and
an attachment configured to connect the chassis structure to the hollow beam of the body structure, the attachment including:
a tube nut, having:
an internal thread;
a cylindrical outer surface including a first portion and a second portion; and
a bottom portion including a flange and a bottom surface;
a first bulkhead having a cavity surface configured to conform to the first portion of the cylindrical outer surface of the tube nut, disposed within the hollow beam, attached to at least two of the walls of the hollow beam, and attached to the tube nut via a first arc weld; and
a bolt having an external thread configured to engage the internal thread of the tube nut;
wherein the first portion of the cylindrical outer surface of the tube nut is disposed in close proximity to the cavity surface of the first bulkhead;
wherein a groove is formed between the first bulkhead and the tube nut;
wherein the first arc weld is located in the groove formed between the first bulkhead and the tube nut;
wherein the bottom surface of the tube nut contacts the inner surface of the bottom wall of the hollow beam; and
wherein the bolt extends from the chassis mount of the chassis structure, through the hole in the bottom wall of the hollow beam, and into the tube nut, engaging the internal thread of the tube nut with the external thread of the bolt to connect the chassis structure to the body structure.

18. The vehicle of claim 17, further comprising a second bulkhead having a cavity surface configured to conform to the second portion of the cylindrical outer surface of the tube nut and configured to form a slot, the second bulkhead disposed within the hollow beam and attached to at least two of the walls of the hollow beam and the first bulkhead;
wherein the second bulkhead is attached to the tube nut via a second arc weld located in the slot; and
wherein the second portion of the cylindrical outer surface of the tube nut is disposed in close proximity to the cavity surface of the second bulkhead.

* * * * *